United States Patent
McConnell et al.

(10) Patent No.: US 11,196,737 B2
(45) Date of Patent: Dec. 7, 2021

(54) SYSTEM FOR SECONDARY AUTHENTICATION VIA CONTACTLESS DISTRIBUTION OF DYNAMIC RESOURCES

(71) Applicant: BANK OF AMERICA CORPORATION, Charlotte, NC (US)

(72) Inventors: Patrick Thomas McConnell, Huntersville, NC (US); William Bradley Burks, Charlotte, NC (US); Daniel James Doherty, Huntersville, NC (US); Justin Riley duPont, Charlotte, NC (US); Thomas Elliott, Redwood City, CA (US); Tony England, Tega Cay, SC (US); Matthew Murphy, Charlotte, NC (US); Nickolas Patrick Parker, Charlotte, NC (US); Stephen Philip Selfridge, Huntersville, NC (US); Steven Michael Twombly, Saco, ME (US); James J. Williams, Lincoln University, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 354 days.

(21) Appl. No.: 16/399,877

(22) Filed: Apr. 30, 2019

(65) Prior Publication Data
US 2020/0351262 A1    Nov. 5, 2020

(51) Int. Cl.
*H04L 29/06* (2006.01)
*G06Q 30/06* (2012.01)
*H04W 12/06* (2021.01)

(52) U.S. Cl.
CPC ..... *H04L 63/0853* (2013.01); *G06Q 30/0609* (2013.01); *H04W 12/06* (2013.01)

(58) Field of Classification Search
CPC ... H04L 63/0853; H04L 63/20; H04L 63/102; G06Q 30/0609; G06Q 20/352; H04W 12/06; H04W 12/47
See application file for complete search history.

(56) References Cited

U.S. PATENT DOCUMENTS

| 919,598 A | 4/1909 | Kuebler |
| 954,785 A | 4/1910 | Craven |

(Continued)

FOREIGN PATENT DOCUMENTS

| CA | 2338447 A1 | 2/2000 |
| CN | 204759477 U | 11/2015 |

(Continued)

OTHER PUBLICATIONS

Gupta, Sandeep et al., Demystifying Authentication Concepts in Smartphones: Ways and Types to Secure Access by Gasparetti (Year: 2017), 36 pages.

*Primary Examiner* — Mohammad W Reza
(74) *Attorney, Agent, or Firm* — Michael A. Springs; Moore & Van Allen PLLC; Thomas R. Parker II (57) ABSTRACT

Embodiments of the present invention provide a system for secondary authentication via contactless distribution of dynamic resources. When an event request associated with a user is received, a prompt for event information is transmitted to a computing device. Based on the event information that is received, a determination is made that the event request requires a secondary authentication in the form of a near field communication ("NFC") interaction between an NFC chip associated with the user and a secondary authentication device. The NFC chip associated with the user may additionally be associated with a dynamic resource value element. Once the NFC interaction is detected, a dynamic resource value is extracted and compared to an expected (Continued)

dynamic resource value. If the values match, then the user is authenticated for the requested event at the secondary authentication level.

20 Claims, 6 Drawing Sheets (56) References Cited

U.S. PATENT DOCUMENTS

| | | | |
|---|---|---|---|
| 4,613,269 | A | 9/1986 | Wilder et al. |
| 4,862,160 | A | 8/1989 | Ekchian et al. |
| 5,386,564 | A | 1/1995 | Shearer et al. |
| 5,396,630 | A | 3/1995 | Banda et al. |
| 5,892,946 | A | 4/1999 | Woster et al. |
| 5,977,875 | A | 11/1999 | Lin et al. |
| 6,134,559 | A | 10/2000 | Brumme et al. |
| 6,226,792 | B1 | 5/2001 | Goiffon et al. |
| 6,597,801 | B1 | 7/2003 | Cham et al. |
| 6,895,486 | B2 | 5/2005 | Wong et al. |
| 6,918,541 | B2 | 7/2005 | Knowles et al. |
| 6,941,285 | B2 | 9/2005 | Sarcanin |
| 6,968,439 | B2 | 11/2005 | Wong et al. |
| 7,346,900 | B2 | 3/2008 | Souloglou et al. |
| 7,362,219 | B2 | 4/2008 | Nogami et al. |
| 7,668,406 | B2 | 2/2010 | Schnee et al. |
| 7,822,688 | B2 | 10/2010 | Labrou et al. |
| 7,844,582 | B1 | 11/2010 | Arbilla et al. |
| 7,886,156 | B2 | 2/2011 | Franchi |
| 8,117,085 | B1 | 2/2012 | Smith |
| 8,332,272 | B2 | 12/2012 | Fisher |
| 8,346,210 | B2 | 1/2013 | Balsan et al. |
| 8,346,857 | B2 | 1/2013 | Denker et al. |
| 8,352,323 | B2 | 1/2013 | Fisher |
| 8,423,466 | B2 | 4/2013 | Lanc |
| 8,630,905 | B2 | 1/2014 | Fisher |
| 8,662,401 | B2 | 3/2014 | Skowronek et al. |
| 8,705,873 | B2 | 4/2014 | Voloshynovskiy et al. |
| 8,751,313 | B2 | 6/2014 | Fisher |
| 8,751,314 | B2 | 6/2014 | Fisher |
| 8,805,739 | B2 | 8/2014 | Brown et al. |
| 8,864,024 | B1 | 10/2014 | Cummins et al. |
| 9,015,066 | B2 | 4/2015 | Scipioni et al. |
| 9,117,237 | B2 | 8/2015 | Levitt et al. |
| 9,189,783 | B2 | 11/2015 | Chowdhury et al. |
| 9,218,624 | B2 | 12/2015 | Moghadam |
| 9,367,921 | B2 | 6/2016 | Boardman et al. |
| 9,379,841 | B2 | 6/2016 | Fine et al. |
| 9,384,480 | B2 | 7/2016 | Jain |
| 9,396,467 | B2 | 7/2016 | Chiang |
| 9,563,890 | B2 | 2/2017 | Zhou |
| 9,767,442 | B2 | 9/2017 | Killian et al. |
| 9,785,940 | B2 | 10/2017 | deOliveira et al. |
| 9,824,349 | B2 | 11/2017 | Xing et al. |
| 9,824,355 | B2 | 11/2017 | Aabye et al. |
| 9,830,589 | B2 | 11/2017 | Xing |
| 9,836,744 | B2 | 12/2017 | Fisher |
| 9,904,923 | B2 | 2/2018 | Mattsson et al. |
| 9,911,116 | B1 | 3/2018 | Lewis et al. |
| 9,953,308 | B2 | 4/2018 | Xing |
| 9,984,360 | B2 | 5/2018 | Jooste |
| 9,985,699 | B1 | 5/2018 | Cronin |
| 10,083,447 | B1 | 9/2018 | Chiarella et al. |
| 10,127,541 | B2 | 11/2018 | Abifaker |
| 10,128,914 | B1 | 11/2018 | Calabrese |
| 10,140,603 | B2 | 11/2018 | Fisher |
| 10,152,706 | B2 | 12/2018 | Caceres et al. |
| 2005/0140495 | A1 | 6/2005 | Yamazaki et al. |
| 2009/0043681 | A1 | 2/2009 | Shoji et al. |
| 2009/0112765 | A1* | 4/2009 | Skowronek .......... G06Q 20/322 705/44 |
| 2010/0211504 | A1 | 8/2010 | Aabye et al. |
| 2010/0217682 | A1 | 8/2010 | Chan |
| 2011/0320293 | A1 | 12/2011 | Khan |
| 2012/0011063 | A1 | 1/2012 | Killian et al. |
| 2012/0246079 | A1* | 9/2012 | Wilson ............... G06Q 20/3226 705/67 |
| 2012/0303496 | A1 | 11/2012 | Musfeldt |
| 2013/0020389 | A1* | 1/2013 | Barnett .............. G06Q 20/3278 235/380 |
| 2013/0134216 | A1 | 5/2013 | Spodak et al. |
| 2014/0136405 | A1 | 5/2014 | DuCharme et al. |
| 2014/0136759 | A1 | 5/2014 | Sprouse et al. |
| 2014/0214678 | A1 | 7/2014 | Williams et al. |
| 2014/0256251 | A1 | 9/2014 | Caceres et al. |
| 2015/0350177 | A1 | 12/2015 | Sharp et al. |
| 2016/0012465 | A1 | 1/2016 | Sharp |
| 2016/0055513 | A1 | 2/2016 | Kuhn et al. |
| 2016/0155111 | A1* | 6/2016 | Arnald ............... G06Q 20/4012 705/41 |
| 2016/0164680 | A1 | 6/2016 | Liao et al. |
| 2016/0307186 | A1 | 10/2016 | Noe et al. |
| 2017/0169422 | A1 | 6/2017 | Ye et al. |
| 2017/0185993 | A1 | 6/2017 | Sawant et al. |
| 2017/0255920 | A1 | 9/2017 | Prakash et al. |
| 2017/0262822 | A1 | 9/2017 | Conyers |
| 2017/0262832 | A1 | 9/2017 | Deshpande et al. |
| 2017/0352035 | A1 | 12/2017 | Geraud |
| 2017/0364895 | A1 | 12/2017 | Van Heerden et al. |
| 2017/0372289 | A1 | 12/2017 | Fitzsimmons et al. |
| 2018/0025348 | A1 | 1/2018 | Shauh et al. |
| 2018/0204195 | A1 | 7/2018 | Kang |
| 2018/0211248 | A1 | 7/2018 | Sims et al. |
| 2018/0315048 | A1 | 11/2018 | Xiu et al. |
| 2019/0009168 | A1 | 1/2019 | Aman et al. |
| 2019/0042816 | A1 | 2/2019 | McQuade et al. |
| 2019/0043052 | A1 | 2/2019 | Ledford et al. |
| 2019/0095925 | A1 | 3/2019 | Gabriele et al. |
| 2019/0199714 | A1 | 6/2019 | Kamal et al. |
| 2020/0092087 | A1 | 3/2020 | Hillan et al. |
| 2020/0302436 | A1 | 9/2020 | Ilincic et al. |

FOREIGN PATENT DOCUMENTS

| | | |
|---|---|---|
| ES | 2677320 T3 | 8/2018 |
| WO | 2013155563 A1 | 10/2013 |

* cited by examiner

SYSTEM FOR SECONDARY AUTHENTICATION VIA CONTACTLESS DISTRIBUTION OF DYNAMIC RESOURCES

BACKGROUND

As the modalities for transmitting resources become more efficient and effortless, the need to accurately authenticate users involved in the transmissions becomes of greater importance. As such, the use of additional security measures, including secondary authentication requirements that involve near field communication ("NFC") chip interactions and dynamic resource values, are desired to protect the integrity of sensitive resources during transmission events.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for secondary authentication via contactless distribution of dynamic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a transaction request associated with a user, wherein the user is associated with a near field communication (NFC) chip. The system may then transmit a prompt for transaction information associated with the transaction request, and receive the transaction information. Next, the system may determine, based on the received transaction information, that a secondary authentication is required to process the transaction and transmit a prompt for secondary authentication of an NFC interaction between the NFC chip associated with the user and a transaction authentication device. The system may then detect, at a transaction authentication device, the NFC interaction between the NFC chip associated with the user and the transaction authentication device. Finally, the system may then process the requested transaction in response to detecting the NFC interaction between the NFC chip associated with the user and the transaction authentication device.

In some embodiments of the system, the transaction request is received by a transaction authentication device associated with a merchant, an online portal associated with the merchant, or a computing device associated with the user. In some such embodiments, transmitting the prompt for the transaction information associated with the transaction request comprises transmitting the prompt for the transaction information associated with the transaction request to the transaction authentication device associated with the merchant or the computing device associated with the user. The system may then receive the transaction information comprises receiving the transaction information from the transaction authentication device associated with the merchant or the computing device associated with the user.

In some embodiments of the system the NFC chip associated with the user is embedded in a physical card, an wherein resource information written onto the NFC chip comprises at least one of credit card information, debit card information, account information, user information, user account information, shipping information, authentication preference information, transaction amount threshold information, approved transaction type information, prohibited transaction type information, an image associated with the user, and transaction rules.

Determining that the secondary authentication is required to process the transaction may, in some embodiments, comprise identifying a code written on the NFC chip associated with the user, and identifying a rule that the secondary authentication is required by comparing the code written on the NFC chip associated with the user to a database of known codes and associated rules.

The transaction authentication device of the system may comprise a mobile device of the user, an NFC reader device associated with the user, or a transaction device associated with a merchant.

In response to detecting the NFC interaction between the NFC chip associated with the user and the transaction authentication device, the system may then identify an image written on the NFC chip associated with the user and display the image written on the NFC chip associated with the user on a user interface of the transaction authentication device. The system can also prompt a second user associated with the transaction authentication device to authenticate the user based on the displayed image, and receive an indication that the second user has authenticated the user based on the displayed image.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Figure 1:
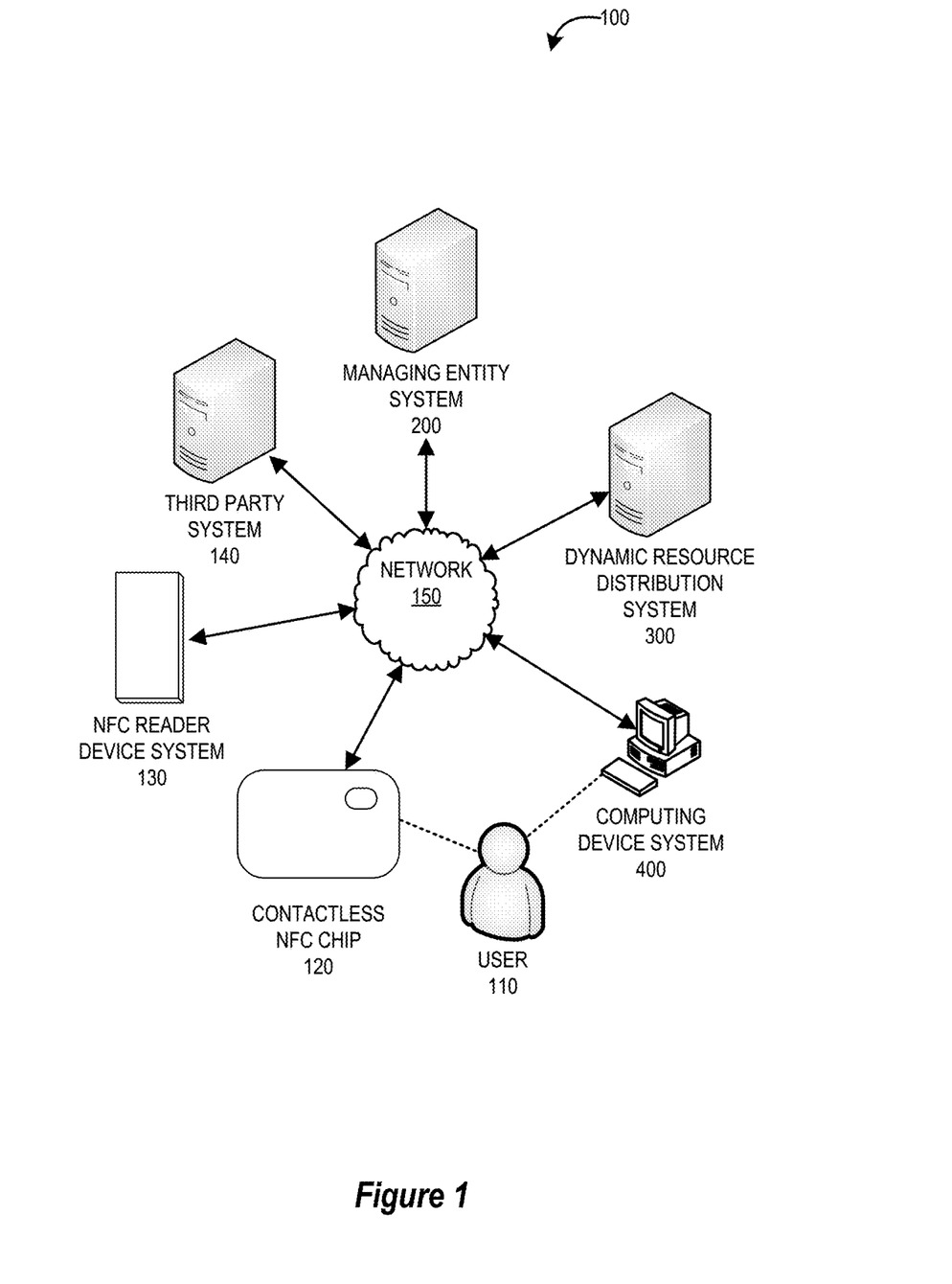
FIG. 1 provides a block diagram illustrating a system environment for contactless distribution of dynamic resources, in accordance with an embodiment of the invention.

FIG. 1 provides a block diagram illustrating a system environment 100 for contactless distribution of dynamic resources, in accordance with an embodiment of the invention. As illustrated in FIG. 1, the environment 100 includes a managing entity system 200, a dynamic resource distribution system 300, one or more computing device systems 400, a contactless NFC chip 120 (e.g., an NFC chip embedded in a physical card), one or more NFC reader device systems 130, and one or more third party systems 140. One or more users 110 may be included in the system environment 100. In some embodiments, the user(s) 110 of the system environment 100 may be customers of a managing entity that controls or otherwise owns the managing entity system 200 and may, in some embodiments, comprise a financial institution.

The managing entity system 200, the dynamic resource distribution system 300, the one or more computing device systems 400, the contactless NFC chip 120, the NFC reader device system 130, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the contactless NFC chip 120 may be in connection with the network 150 only when the contactless NFC chip 120 is within an NFC interaction distance of the NFC reader device system 130, the third party system 140, or the computing device system 400, where the NFC interaction distance is a distance between the contactless NFC chip 120 and an NFC reader device at which communication of information stored in the contactless NFC chip 120 can occur.

The managing entity system 200 may be a system owned or otherwise controlled by a managing entity to perform one or more process steps described herein. In some embodiments, the managing entity is a financial institution. In general, the managing entity system 200 is configured to communicate information or instructions with the dynamic resource distribution system 300, the one or more computing device systems 400, and/or the third party system 140 across the network 150. For example, the managing entity system 200 may maintain account data for the user 110 and therefore may receive a transaction request or other event request associated with the user 110 (e.g., via a third party system 140 comprising a merchant system), compare received information to an internal database of a user account associated with the user 110, and transmit authentication or other approval information to the dynamic resource distribution system 300, the NFC reader device system 130, the third party system 140, the computing device system 400, or the like. Of course, the managing entity system 200 may be configured to perform (or instruct other systems to perform) one or more other process steps described herein, including the steps described with respect to FIG. 5 and FIG. 6. The managing entity system 200 is described in more detail with respect to FIG. 2.

The dynamic resource distribution system 300 may be a system owned or controlled by the managing entity and/or a third party that specializes in transactions involving NFC chips, dynamic card verification value systems, user authentication systems, transaction rule systems, and the like. In some embodiments, at least a portion of the dynamic resource distribution system 300 may be controlled by or otherwise be a component of the managing entity system 200. In general, the dynamic resource distribution system 300 is configured to communicate information or instructions with the managing entity system 200, the one or more computing device systems 400, the contactless NFC chip 120, the NFC reader device system 130, and/or the third party system 140 across the network 150.

For example, the dynamic resource distribution system 300 may receive dynamic data values from the third party system 140, the managing entity system 200, the computing device system 400, the NFC reader device system 130, or the contactless NFC chip 120 (e.g., indirectly, via another system). The dynamic resource distribution system 300 may then compare received dynamic data values to an expected dynamic data value stored in a user account associated with the user to determine whether the dynamic data value matches the expected dynamic data value and automatically cause the computing device system 400 of the user 110 to populate a digital wallet application with information extracted from the contactless NFC chip 120. Of course the dynamic resource distribution system 300 may be configured to perform (or instruct other systems to perform) one or more other process steps described herein, including the steps described with respect to FIG. 5 and FIG. 6. The dynamic resource distribution system 300 is described in more detail with respect to FIG. 3.

The computing device system 400 may be a system owned or controlled by the managing entity, the user 110, and/or a third party that specializes in providing computers, mobile devices, or other computing devices that are configured to securely store and maintain digital wallets and/or initiate transaction requests. The computing device system 400 may, in some embodiments, include an NFC chip and/or an NFC chip reader, writer, or other NFC module configured to interact with external NFC chips.

In general, the computing device system 400 is configured to communicate information or instructions with the managing entity system 200, the dynamic resource distribution system 300, the contactless NFC chip 120, the NFC reader device system 130, and/or the third party system 140 across the network 150. For example, the computing device system 400 may detect an NFC interaction with the contactless NFC chip 120, extract resource information from the contactless NFC chip, including a dynamic data value, transmit the dynamic data value to the managing entity system 200 and/or the dynamic resource distribution system 300, and receive a confirmation that the transmitted dynamic data value matches an expected dynamic data value for the user 110. Of course, the computing device system 400 may be configured to perform (or instruct other systems to perform) one or more other process steps described herein, including the steps described with respect to FIG. 5 and FIG. 6. The computing device system 400 is described in more detail with respect to FIG. 4.

The contactless NFC chip 120 may comprise any near field communication chip, near field communication tag, near field communication inlay, or the like that is configured to store information, data, codes, or the like. In some embodiments, the NFC chip 120 may be embedded within, or otherwise be a component of, a physical card (e.g., a credit card, a debit card, a gift card, or the like). The NFC chip 120 may also be embedded within or otherwise be a component of another physical element including, but not limited to, a check, a receipt, a bill, a financial statement, an physical letter comprising an offer for a financial account, or the like.

In some embodiments, the contactless NFC chip is a component of the computing device system 400 (e.g., an NFC tag or NFC inlay stored within a mobile phone, a smart watch, an Internet of things device, or the like). While a single contactless NFC chip 120 is illustrated in FIG. 1, it should be known that multiple contactless NFC chips 120 may be present in the system environment 100, and different contactless NFC chips 120 may be utilized to perform one or more of the process steps described herein.

In some embodiments, the contactless NFC chip 120 is in direct communication with, or is otherwise manipulated by a dynamic resource element (e.g., a dynamic card verification value, a dynamic card verification code, a digital dynamic card verification value, a time based number, a card-unique key, or the like). For example, in embodiments where the contactless NFC chip 120 is stored on a physical card, the same physical card may additionally include a digital dynamic card verification value component that automatically, or in response to a user depressing a triggering button on the card, causes the contactless NFC chip 120 to transmit a dynamic resource value or dynamic data value to any NFC reader device within the NFC interaction distance. The dynamic resource value may comprise a multi-character code that is based on a specific algorithm associated with a user account of the user 110 that is associated with the contactless NFC chip (and the physical card), such that the dynamic resource value at any given time will match an expected dynamic resource value that can be determined based on the specific algorithm.

The contactless NFC chip 120 may be issued by the managing entity system 200, the dynamic resource distribution system 300, or a third party system 140, and/or, in some embodiments, may be manipulated (e.g., data may be written onto the contactless NFC chip 120) by the computing device system 400 associated with the user 110.

Information stored in the contactless NFC chip 120 may comprise, but is not limited to, credit card information (e.g., card number information, user account information, billing information, and the like), debit card information, account information for the associated user 110, user account information associated with the user (e.g., shipping address, name, other accounts of the user 110, geographic region of the user 110, transaction rules established by or for the user 110, or the like), shipping information, authentication preference information, transaction amount threshold information, approved transaction type information (e.g., approved merchants, approved product or service types, or the like), prohibited transaction type information (e.g., prohibited merchants, prohibited product or service types, or the like), an image associated with the user 110 (e.g., an image of the face of the user 110, a security image associated with the user 110, or the like), and transaction rules associated with the user 110 and/or an associated card or account of the user 110.

In some embodiments, this information stored in the contactless NFC chip 120 may be stored in the form of standard codes that are readable by NFC reader devices (e.g., the NFC reader device system 130), NFC modules, or the like. In some embodiments, at least some of the information stored in the contactless NFC chip 120 comprises codes that can be extracted by NFC reader devices and then transmitted to the managing entity system 200 and/or the dynamic resource distribution system 300 to prompt those systems to match the extracted codes to the associated information that can then be transmitted back to the NFC reader devices or associated devices or systems. For example, information that would otherwise require the transfer of a large amount of data (e.g., an image of the face of the user, a transaction rule, or the like) to efficiently effectuate the communication of that information from the contactless NFC chip 120 to an NFC reader device system 130 (which may include a computing device system 400) may instead be communicated as a code which is communicated to the managing entity system 200, which in turn responds with the large amount of data.

The NFC reader device system 130, while illustrated as a stand-alone device, may be a component of the managing entity system 200, the dynamic resource distribution system 300, the computing device system 400, and/or a third party system 140. For example, in some embodiments, the NFC reader device system 130 comprises a point of sale device associated with a merchant system (e.g., a third party system 140). In some embodiments, the NFC reader device system 130 comprises an NFC module, an NFC tag, or the like that is associated with the user 110 and/or the computing device system 400 of the user 110. For example, the NFC reader device system 130 may comprise an NFC module that is a component of the computing device system 140. In another example, the NFC reader device system 130 may comprise an NFC module that is separate from the computing device system 400 of the user 110, but is known to be in a secure location associated with the user 110 (e.g., located in a home of the user 110, located in a secure office of the user 110, located within a vehicle of the user 110, or the like). In some embodiments of this system environment 100, the user 110 is associated with two separate computing device systems 400 (e.g., a mobile phone and a personal computer device). In such embodiments, the NFC reader device system 130 may comprise an NFC module located within one or both of the multiple computing device systems 400.

The NFC reader device system 130 may comprise a network communication interface, a processing device, and one or more memory devices, where the processing devices are configured to perform certain actions with the memory devices and communicate these actions to the rest of the network 150 through the network communication interface.

The third party system 140 may be any system that interacts with the other systems and devices of the system environment 100 including, but not limited to, merchant systems, automated teller machine device systems, point of sale device systems, online merchant portal systems, regulatory agency systems, data storage systems, third party user authentication systems, third party credit card or debit card systems, transaction systems, and the like.

Figure 2:
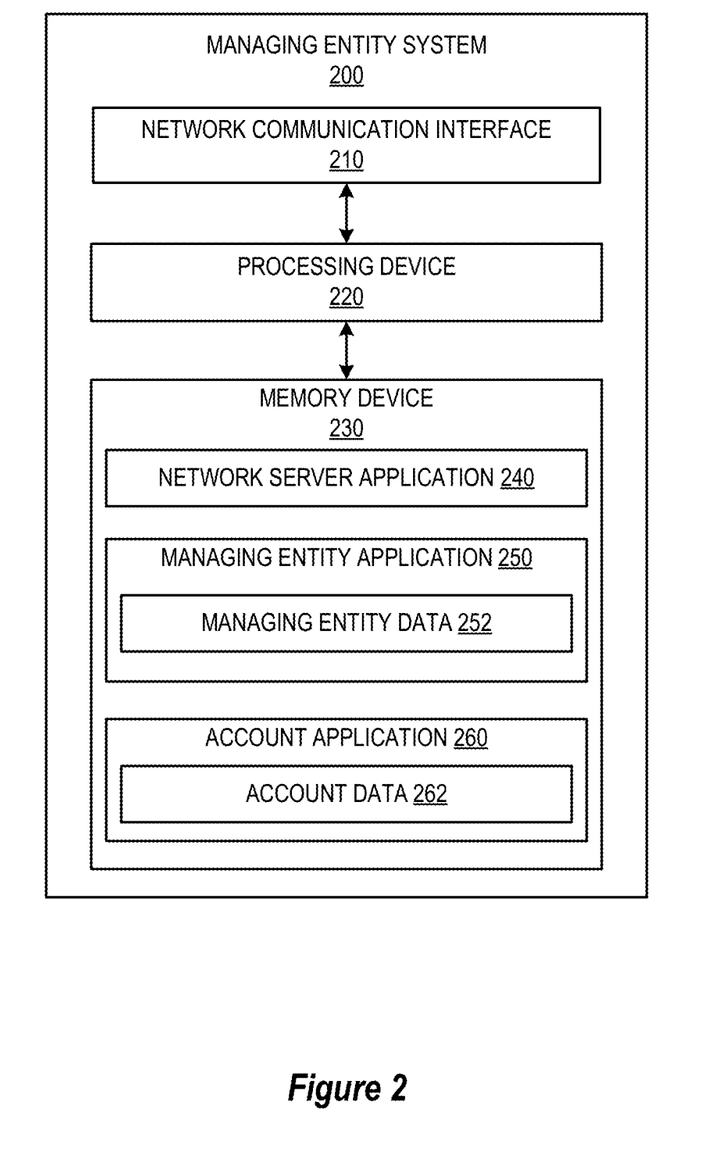
FIG. 2 provides a block diagram illustrating the managing entity system of FIG. 1, in accordance with an embodiment of the invention.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, an account application 260 which includes account data 262, and other computer-executable instructions or other data. The computer-executable program code of the network server application 240, the managing entity application 250, and/or the account application 260 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise user account information for one or more users that are customers of or are otherwise associated with the managing entity. The managing entity data 252 may additionally include transaction data, including information for establishing secure communication channels with transaction devices, authentication devices, NFC reader devices, and the like.

In one embodiment, the account application 260 includes the account data 262. This account data 262 may include financial account information for one or more users associated with the managing entity system 200. For example, the account data 262 may comprise account numbers, routing numbers, account balances, account rules, account preferences, billing information, credit information, loan information, authentication information, dynamic resource value information, expected dynamic resource value information, and the like.

The network server application 240, the managing entity application 250, and the account application 260 are configured to invoke or use the managing entity data 252, the account data 254, and the like when communicating through the network communication interface 210 with the dynamic resource distribution system 300, the one or more computing device systems 400, the contactless NFC chip 120, the NFC reader device system(s) 130, and/or the third party system 140.

Figure 3:
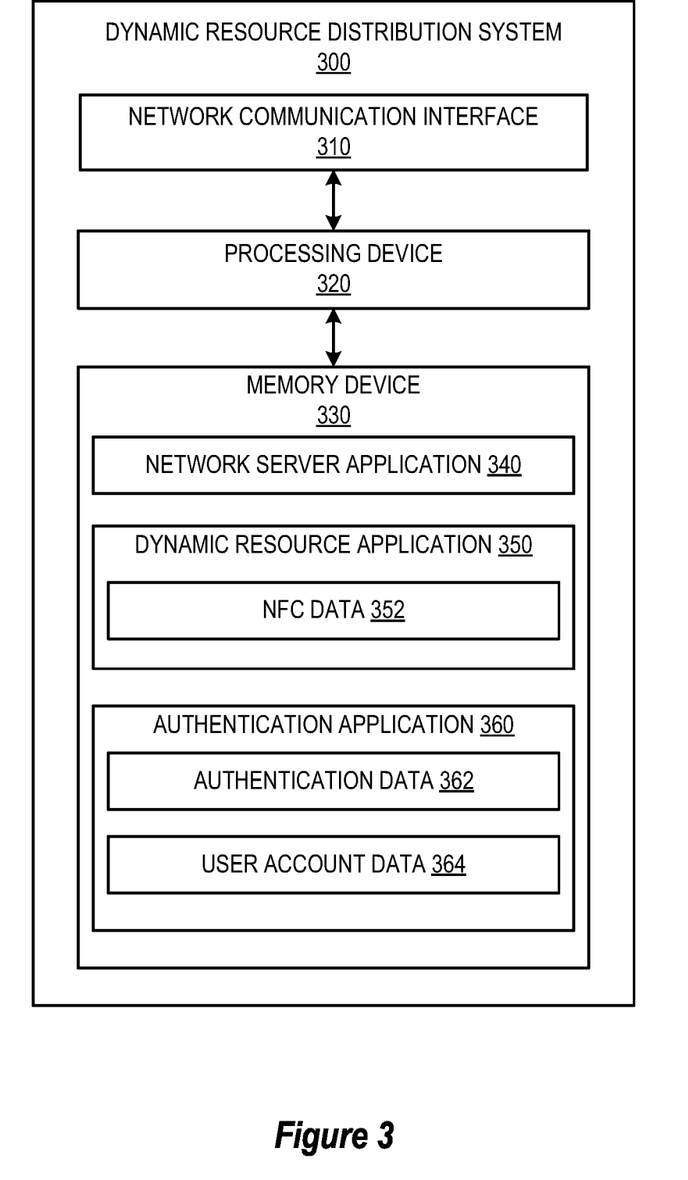
FIG. 3 provides a block diagram illustrating the dynamic resource distribution system FIG. 1, in accordance with an embodiment of the invention.

FIG. 3 provides a block diagram illustrating the dynamic resource distribution system 300, in greater detail, in accordance with embodiments of the invention. As illustrated in FIG. 3, in one embodiment of the invention, the dynamic resource distribution system 300 includes one or more processing devices 320 operatively coupled to a network communication interface 310 and a memory device 330. In certain embodiments, the dynamic resource distribution system 300 is operated by a first entity, such as a financial institution, while in other embodiments, the dynamic resource distribution system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the dynamic resource distribution system 300 described herein. For example, in one embodiment of the dynamic resource distribution system 300, the memory device 330 includes, but is not limited to, a network server application 340, a dynamic resource application 350 which includes NFC data 352, an authentication application 360 which includes a authentication data 362 and user account data 354, and other computer-executable instructions or other data. The computer-executable program code of the network server application 340, the dynamic resource application 350, and/or the authentication application 360 may instruct the processing device 320 to perform certain logic, data-processing, and data-storing functions of the dynamic resource distribution system 300 described herein, as well as communication functions of the dynamic resource distribution system 300.

In one embodiment, the dynamic resource application 350 includes NFC data 352. The NFC data 352 may comprise information for writing data or information associated with one or more users onto NFC chips associated with those one or more users. The NFC data 352 may additionally or alternatively include information for comparing data received from NFC interactions to a stored database (e.g., a relational database) of associated information. For example, the NFC data 352 may include codes and associated information (e.g., transaction rules, images of users, documents associated with users, or the like) such that when the dynamic resource distribution system 300 receives a code from an NFC interaction, the dynamic resource application 350 can match that code to its associated data in the database to identify or determine the associated information that is being referenced.

In one embodiment, the authentication application 360 includes authentication data 362 and user account data 364. The authentication data 362 may include passwords, personal identification numbers, security questions, biometric information, dynamic resource value information, expected dynamic resource value information, authentication images (e.g., images of a user's face), stepped-up authentication information, or other authentication credentials (including secondary or stepped-up authentication credentials) associated with one or more users. This authentication data 362 can be accessed by the authentication application 360 to compare received authentication credentials to the stored authentication credentials when determining whether a user is authorized for a transaction, for receiving access to an account, for receiving access to a digital wallet, or the like. The user account data 364 may comprise any additional information that the authentication application 360 may store for use in authenticating a user, establishing a contactless NFC chip for a user (e.g., populating the NFC chip with information about the user, the user's authentication requirements or rules, the user's account information, or the like).

The network server application 340, the dynamic resource application 350, and the authentication application 360 are configured to invoke or use the NFC data 352, the authentication data 362, the user account data 364, and the like when communicating through the network communication interface 310 with the managing entity system 200, the one or more computing device systems 400, the contactless NFC chip 120, the NFC reader device system(s) 130, and/or third party systems 140.

Figure 4:
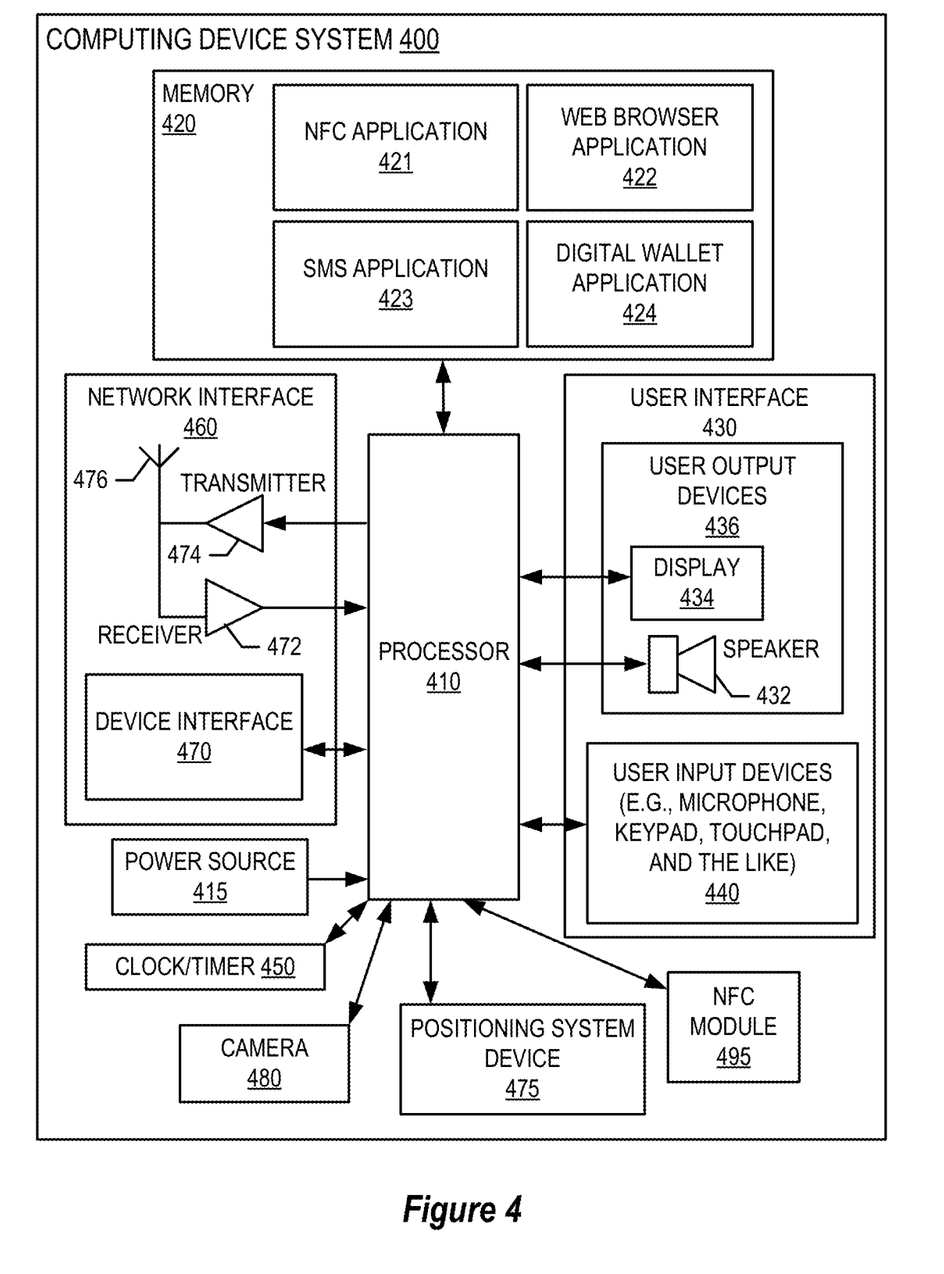
FIG. 4 provides a block diagram illustrating the computing device system of FIG. 1, in accordance with an embodiment of the invention.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Furthermore, it should be known that multiple computing device systems 400 may be owned by or accessed by the user 110 within the system environment 100 of FIG. 1, and these separate computing device systems 400 may be in network communication with each other and the other systems and devices of the system environment 100. For example, a first computing device system 400 may comprise a mobile phone of the user 110 that includes an NFC chip with resource data stored therein, and this mobile phone may be placed within an NFC interaction distance from an NFC reader device of a second computing device system 400 that comprises a personal computer of the user 110.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/ code executed by the processor 410 to implement the functions of the computing device system 400 and/or one or more of the process/method steps described herein. For example, the memory 420 may include such applications as a conventional web browser application 422, or an NFC application 421, a digital wallet application 424, (or any other application provided by the managing entity system 200). These applications also typically instructions to a graphical user interface (GUI) on the display 430 that allows the user 110 to interact with the computing device system 400, the managing entity system 200, and/or other devices or systems. In one embodiment of the invention, when the user 110 decides to enroll in an NFC application 421 program, the user 110 downloads, is assigned, or otherwise obtains the NFC application 421 from the managing entity system 200, or from a distinct application server (e.g., from the dynamic resource distribution system 300). In other embodiments of the invention, the user 110 interacts with the managing entity system 200 or the dynamic resource distribution system 300 via the web browser application 422 in addition to, or instead of, the NFC application 421. The same mechanisms may be put in place to install, store, or otherwise access the digital wallet application 424.

The memory 420 of the computing device system 400 may comprise a Short Message Service (SMS) application 423 configured to send, receive, and store data, information, communications, alerts, and the like via a wireless telephone network.

The NFC application 421 may comprise an application stored in the memory 420 that is configured to control and/or communicate with an NFC module 495 of the mobile device system 400 to receive NFC data or information (e.g., codes, signals, or the like) from contactless NFC chips (e.g., the contactless NFC chip 120 described with respect to FIG. 1). The NFC application 421 may also be configured to communicate information received from the NFC module 495 to the digital wallet application 424, the web browser application 422, and/or the SMS application 423. In some embodiments, the NFC application 421 may be configured to receive instructions from a separate system (e.g., the managing entity system 200, the dynamic resource distribution system 300, a separate computing device system 400, an NFC reader device system 130, and/or a third party system 140 like a merchant system) and cause one or more components of the computing device system 400 to perform one or more actions. For example, the NFC application 421 may be configured to receive instructions for erasing certain information from an NFC chip and writing new information on that NFC chip. The NFC application 421 may then cause the NFC module 495 to erase the certain information from an NFC chip that is within an NFC interaction distance of the NFC module 495 and then write the new information onto the NFC chip.

The digital wallet application 424 of the computing device system 400 may comprise an application created by and/or managed by a financial institution that is configured to securely store financial information, account information, user profile information, billing information, shipping information, authentication information, dynamic resource value information (e.g., dynamic card verification code information), or the like. The digital wallet application 424 may be configured to receive account or card information (e.g., credit card information) from that has been extracted from an NFC chip and automatically populate fields within the digital wallet application 424 with the extracted information. For example, the extracted information may be formatted such that the information type and the information field is known and by the digital wallet application 424 (e.g., based on position or coding within the extracted NFC data) and can therefore be matched to an applicable field of the digital wallet application 424.

The digital wallet application 424 may additionally be configured to initiate or otherwise communicate information as part of a transaction request. For example, the user 110 may use the computing device system 400 to initiate a transaction by tapping or otherwise positioning the NFC module 495 of the computing device system 400 within an NFC interaction distance from a point of sale device comprising an NFC reader device (e.g., the NFC reader device system 130). This interaction may prompt the digital wallet application 424 to provide transaction information (e.g., credit card information, user name, billing information, and/or the like), and the digital wallet application 424 may then transmit the transaction information to the point of sale device for the purpose of conducting and/or authenticating the requested transaction.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein. For example, the memory 420 may include such data as transaction history data, positional data of the computing device system 400, and the like.

Figure 5:
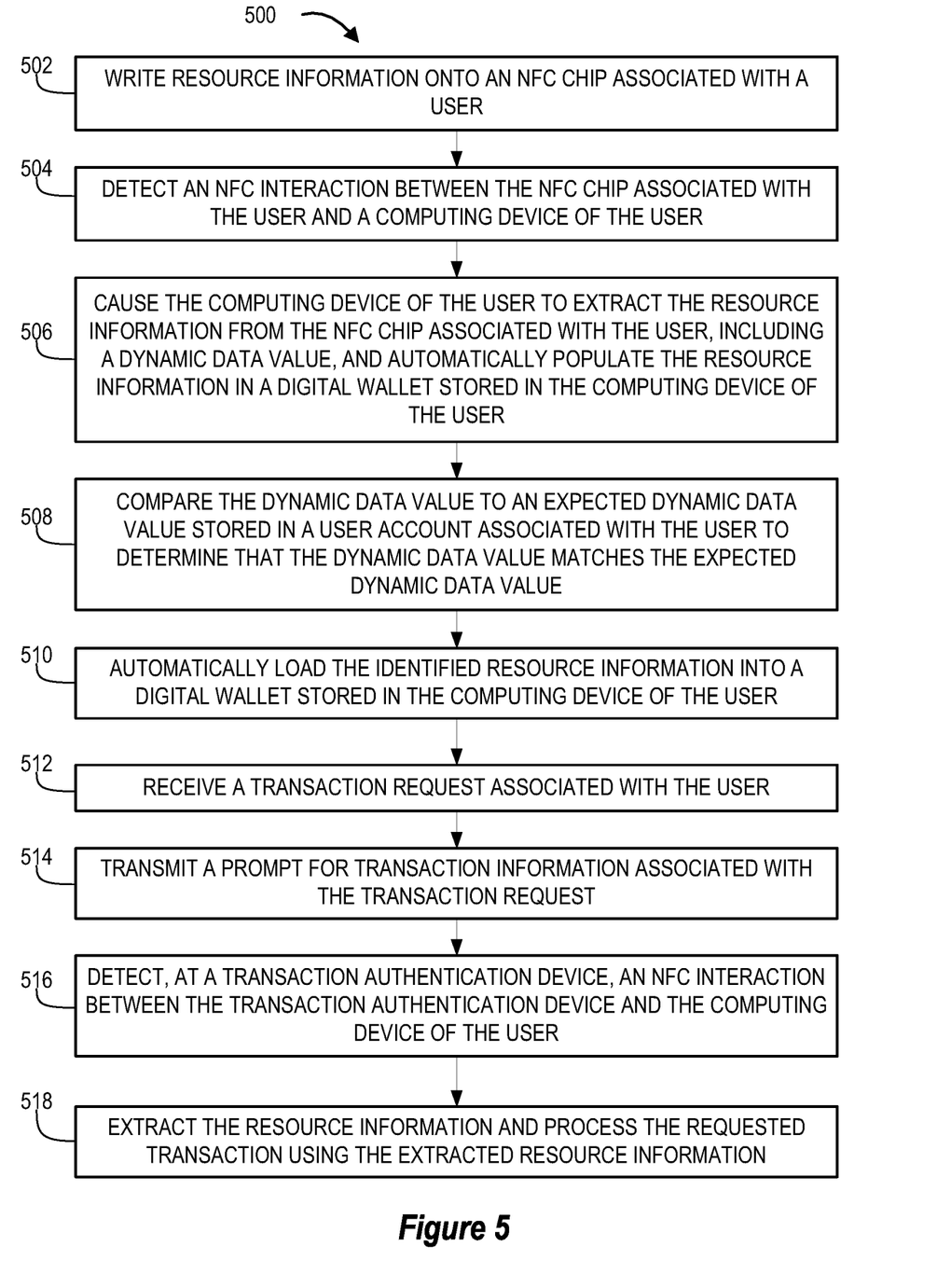
FIG. 5 provides a flowchart illustrating a process for secure contactless distribution of dynamic resources, in accordance with an embodiment of the invention.

Referring now to FIG. 5, a flowchart is provided to illustrate one embodiment of a process 500 for secure contactless distribution of dynamic resources, in accordance with embodiments of the invention. In some embodiments, the process 500 may include block 502, where the system writes resource information onto a near field communication (NFC) chip associated with a user.

The NFC chip associated with the user may, in some embodiments, be embedded in a physical card. The resource information written onto the NFC chip may, in some embodiments, comprise one or more of the following: credit card information, debit card information, account information, user information, user profile information, shipping information, authentication preference information, transaction amount threshold information, approved transaction type information, prohibited transaction type information, an image associated with the user, and transaction rules.

In some embodiments, the process 500 includes block 504, where the system detects an NFC interaction between the NFC chip associated with the user and a computing device of the user. The computing device of the user may comprise a mobile phone, a wearable device, an Internet-of-things device, or a laptop computer. The NFC interaction may comprise a tap or interaction within an NFC distance.

Additionally, in some embodiments, the process 500 includes block 506, where the system causes the computing device of the user to extract the resource information from the NFC chip associated with the user, including a dynamic data value, and automatically populate the resource information in a digital wallet stored in the computing device of the user.

The process 500 may also include block 508, where the system compares the dynamic data value to an expected dynamic data value stored in a user profile associated with the user to determine that the dynamic data value matches the expected dynamic data value.

In some embodiments, the process 500 includes block 510, where, in response to determining that the dynamic data value matches the expected dynamic data value, the system automatically loads the identified resource information into a digital wallet stored in the computing device of the user.

Additionally, in some embodiments, the process 500 includes block 512, where the system receives a transaction request associated with the user. The transaction request may come from a computing device of the user, via an online portal, via a transaction device (e.g., a point of sale device), via an automated teller machine device, or the like.

The process 500 may include block 514, where the system transmits a prompt for transaction information associated with the transaction request. The prompt may be sent to the computing device of the user, the online portal, the transaction device, the automated teller machine device, or the like. In some embodiments, the prompt is sent to a mobile computing device of the user, even if the initial transaction request came from an online portal, a computing device, or a transaction device that is a different device from the mobile computing device.

Furthermore, the process 500 may include block 516, where the system detects, at a transaction authentication device, an NFC interaction between the transaction authentication device and the computing device of the user. The NFC interaction may be between an NFC module (e.g., NFC chip) embedded within the computing device (e.g., a mobile device or smart wearable device) of the user.

The transaction authentication device may, in some embodiments, comprise a point of sale device. The transaction authentication device may, in some embodiments, comprise an NFC reader device associated with the user. For example, the user may have a dedicated NFC reader that is physically located in secure location (e.g., the home of the user, a secure office of the user, a vehicle of the user, or the like). This dedicated NFC reader may be in network communication with a managing entity system, a dynamic resource distribution system, and/or a transaction system, such that the dedicated NFC reader may transmit resource information extracted from the NFC interaction to one or more of those systems.

Finally, the process 500 may continue to block 518, where the system extracts the resource information and processes the requested transaction using the extracted resource information. Processing the requested transaction using the extracted resource information may comprise populating billing information and shipping information for the transaction based on the extracted resource information.

Figure 6:
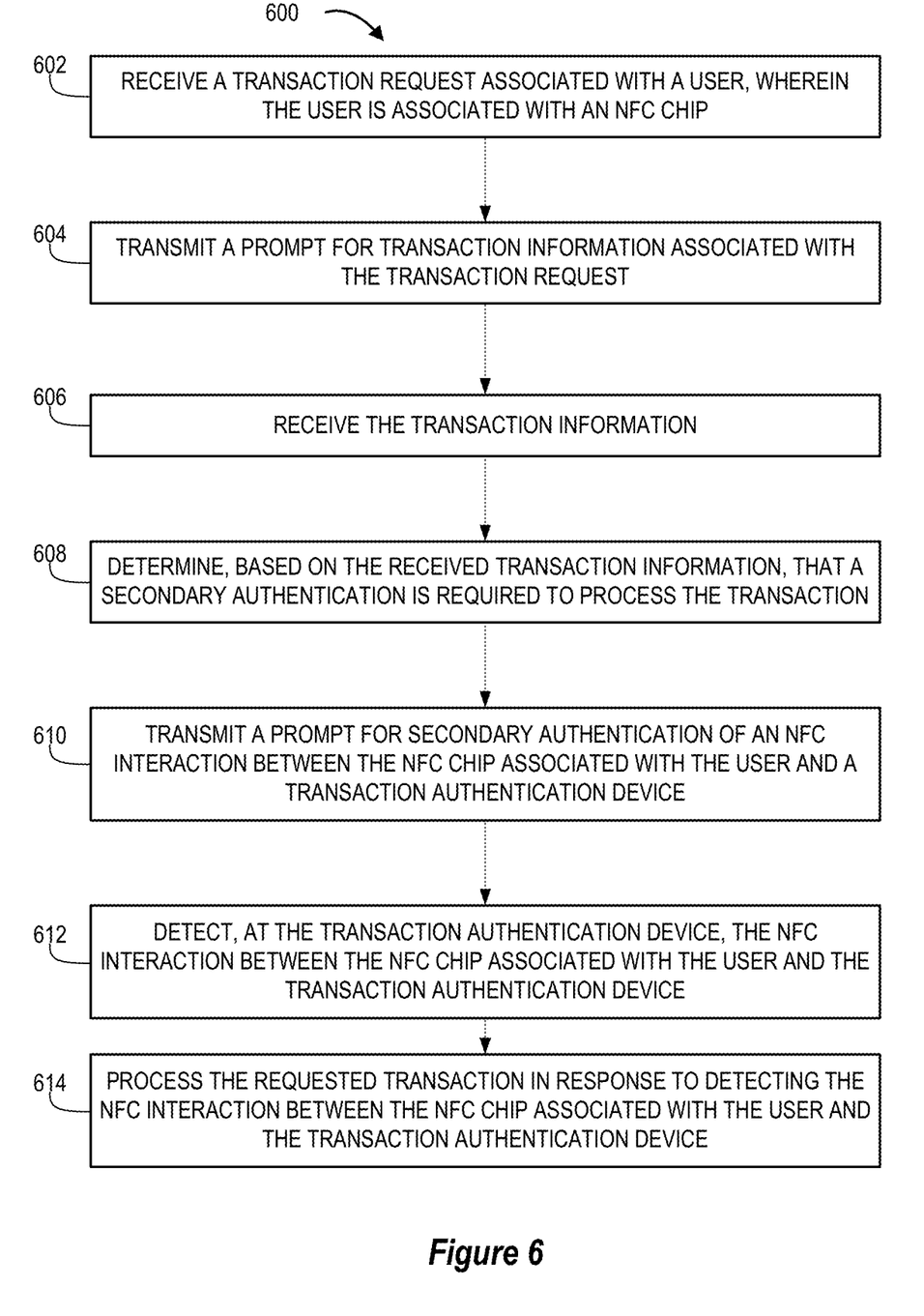
FIG. 6 provides a flowchart illustrating a process for secondary authentication via contactless distribution of dynamic resources, in accordance with embodiments of the invention.

Referring now to FIG. 6, a flowchart is provided to illustrate one embodiment of a process 600 for secondary authentication via contactless distribution of dynamic resources, in accordance with embodiments of the invention. In some embodiments, the process 600 may include block 602, where the system receives a transaction request associated with a user, wherein the user is associated with a near field communication (NFC) chip.

The transaction request may be received by a transaction authentication device associated with a merchant, an online portal associated with the merchant, or a computing device associated with the user.

As noted above with respect to FIG. 5, the NFC chip associated with the user may, in some embodiments, be embedded in a physical card. The resource information written onto the NFC chip may, in some embodiments, comprise one or more of the following: credit card information, debit card information, account information, user information, user profile information, shipping information, authentication preference information, transaction amount threshold information, approved transaction type information, prohibited transaction type information, an image associated with the user, and transaction rules.

Additionally, in some embodiments, the process 600 includes block 604, where the system transmits a prompt for transaction information associated with the transaction request. Transmitting the prompt for the transaction information associated with the transaction request may comprise transmitting the prompt for the transaction information associated with the transaction request to the transaction authentication device associated with the merchant or the computing device associated with the user.

The prompt may be transmitted to a transaction device (e.g., a point of sale device), a computing device of the user, a mobile computing device of the user, an automated teller machine associated with the user, an online portal, or the like. In some embodiments, the transaction request may come from one computing device (e.g., a personal computer, an electronic kiosk, an automated teller machine, a point of sale device, or the like), but this prompt for the transaction information may be transmitted to a mobile computing device of the user that is integrated with an NFC chip that stores at least some of the transaction information.

The process 600 may also include block 606, where the system receives the transaction information. Receiving the transaction information may comprise receiving the transaction information from the transaction authentication device associated with the merchant or the computing device associated with the user. The transaction information may include the product or service being sold, the product or service type, the merchant name, the merchant type, the transaction amount, and the like. The transaction information may additionally include other information like card information that a user is attempting to utilize for the transaction, account information that the user is attempting to utilize for the transaction, one or more transaction or account rules associated with the user, or the like. In some embodiments, the transaction information is transmitted in response to the transaction device and/or the computing device of the user receiving at least a portion of the transaction information from an NFC interaction with the NFC chip associated with the user.

In some embodiments, the process 600 includes block 608, where the system determines, based on the received transaction information, that a secondary authentication is required to process the transaction. Determining that the secondary authentication is required to process the transaction may be conducted based on identifying a code written on the NFC chip associated with the user. The system may then identify a rule that the secondary authentication is required by comparing the code written on the NFC chip associated with the user to a database of known codes and associated rules.

Additionally, in some embodiments, the process 600 includes block 610, where the system transmits a prompt for secondary authentication of an NFC interaction between the NFC chip associated with the user and a transaction authentication device. As with the above-described prompt for the transaction information, this prompt for the secondary authentication of the NFC interaction (e.g., a tap or close contactless interaction) may be transmitted to a device that is different from the transaction device. For example, if a point of sale device is initiating the transaction, the system may transmit this prompt for secondary authentication to a mobile computing device of the user in addition to, or in lieu of, the point of sale device.

The transaction authentication device may comprise a mobile device of the user, an NFC reader device associated with the user, or a transaction device associated with a merchant. As such, the user may present the NFC chip (which may be embedded within a physical card) to the transaction authentication device, which may not be the same device as the transaction device. In embodiments where the transaction device is a computing device of the user, and the user is executing a transaction on an online portal, the transaction authentication device may be the mobile device of the user, such that the user can present a card with the NFC chip to a portion of the mobile device associated with an NFC module. The same arrangement can be used when the user is executing a transaction with a merchant at a point of sale device, where either the point of sale device or the mobile device of the user can be the transaction authentication device to which the user will put the NFC chip in contact.

The process 600 may include block 612, where the system detects, at a transaction authentication device, the NFC interaction between the NFC chip associated with the user and the transaction authentication device.

In response to detecting the NFC interaction between the NFC chip associated with the user and the transaction authentication device, the system may additionally perform the step of identify an image written on the NFC chip associated with the user. In some embodiments, identifying the image written on the NFC chip may comprise receiving a code written on the NFC chip, and matching that code to an image of the user in a relational database. The system may then display the image written on the NFC chip associated with the user on a user interface of the transaction authentication device and prompt a second user associated with the transaction authentication device to authenticate the user based on the displayed image. The system may then receive an indication that the second user has authenticated the user based on the displayed image, which indicates that the user is authenticated for the requested transaction.

Finally, the process 600 may include block 614, where the system processes the requested transaction in response to detecting the NFC interaction between the NFC chip associated with the user and the transaction authentication device.

In embodiments where the secondary authentication fails (e.g., no secondary authentication is provided, the resource information is identified as malfeasant, the merchant does not authenticate the user because the displayed image of the user does not match the individual involved in the transaction, or the like), the system may determine that at least a portion of the transaction information of the user has been compromised. In response, the system may shut down or otherwise lock the account(s) of the user until the user is able to prove their identity in a highly secure manner (e.g., through physical presence at a physical location of the managing entity, or the like).

In some embodiments, the system may determine that the user is still in possession of a mobile device of the user (e.g., by validating the user through security questions, passcode prompts, verbal communication, transmitted biometric information, or the like). In such embodiments, the system may transmit a signal to the computing device of the user that causes the computing device of the user to erase the resource information from the NFC chip of the user and then to write new resource information onto the NFC chip of the user. In this way, the user may begin to use a credit card with the NFC chip embedded that operates with a new number that is different from what was originally on the card (e.g., because the original number was compromised), without having to receive a completely different physical card. Instead, the user can just tap the physical card to the mobile device when prompted (i.e., once the mobile device has received the signal to re-write the NFC chip from the system) and the mobile device will write new card information onto the NFC chip for the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 8964US1.014033.3411 | To be assigned | SYSTEM FOR SECURE CONTACTLESS DISTRIBUTION OF DYNAMIC RESOURCES | Concurrently herewith |
| 8966US1.014033.3412 | To be assigned | RESOURCE DISTRIBUTION HUB GENERATION ON A MOBILE DEVICE | Concurrently herewith |
| 8967US1.014033.3414 | To be assigned | EMBEDDED TAG FOR RESOURCE DISTRIBUTION | Concurrently herewith |
| 9066US1.014033.3449 | To be assigned | RESOURCE DISTRIBUTION INSTRUMENTS WITH EMBEDDED CODES OR COMMUNICATION DEVICES | Concurrently herewith |

The invention claimed is:

1. A system for secondary authentication via contactless distribution of dynamic resources, the system comprising:
 a memory device; and
 a processing device operatively coupled to the memory device, wherein the processing device is configured to execute computer-readable program code to:
  receive a transaction request associated with a user, wherein the user is associated with a near field communication (NFC) chip;
  transmit a prompt for transaction information associated with the transaction request;
  receive the transaction information; determine, based on the received transaction information, that a secondary authentication is required to process the transaction;
  transmit a prompt for secondary authentication of an NFC interaction between the NFC chip associated with the user and a transaction authentication device;
  detect, at a transaction authentication device, the NFC interaction between the NFC chip associated with the user and the transaction authentication device;
  identify an image written on the NFC chip associated with the user based on the NFC interaction;
  receive a secondary authentication confirmation from a second user, wherein the secondary authentication confirmation indicates that the image written on the NFC chip is an image of the user associated with a near field communication (NFC) chip; and
  process the requested transaction in response to the secondary authentication confirmation.

2. The system of claim 1, wherein the transaction request is received by a transaction authentication device associated with a merchant, an online portal associated with the merchant, or a computing device associated with the user.

3. The system of claim 2, wherein:
 transmitting the prompt for the transaction information associated with the transaction request comprises transmitting the prompt for the transaction information associated with the transaction request to the transaction authentication device associated with the merchant or the computing device associated with the user; and
 receiving the transaction information comprises receiving the transaction information from the transaction authentication device associated with the merchant or the computing device associated with the user.

4. The system of claim 1, wherein the NFC chip associated with the user is embedded in a physical card, an wherein resource information written onto the NFC chip comprises at least one of credit card information, debit card information, account information, user information, user account information, shipping information, authentication preference information, transaction amount threshold information, approved transaction type information, prohibited transaction type information, an image associated with the user, and transaction rules.

5. The system of claim 1, wherein determining that the secondary authentication is required to process the transaction comprises:
 identifying a code written on the NFC chip associated with the user; and
 identifying a rule that the secondary authentication is required by comparing the code written on the NFC chip associated with the user to a database of known codes and associated rules.

6. The system of claim 1, wherein the transaction authentication device comprises a mobile device of the user, an NFC reader device associated with the user, or a transaction device associated with a merchant.

7. The system of claim 1, wherein, in response to detecting the NFC interaction between the NFC chip associated with the user and the transaction authentication device, the processing device is further configured to execute computer-readable program code to:
 identify an image written on the NFC chip associated with the user;
 display the image written on the NFC chip associated with the user on a user interface of the transaction authentication device;
 prompt a second user associated with the transaction authentication device to authenticate the user based on the displayed image; and
 receive an indication that the second user has authenticated the user based on the displayed image.

8. A computer program product for secondary authentication via contactless distribution of dynamic resources, the computer program product comprising at least one non-transitory computer readable medium comprising computer readable instructions, the instructions comprising instructions for:
 receiving a transaction request associated with a user, wherein the user is associated with a near field communication (NFC) chip;
 transmitting a prompt for transaction information associated with the transaction request;
 receiving the transaction information;
 determining, based on the received transaction information, that a secondary authentication is required to process the transaction;
 transmitting a prompt for secondary authentication of an NFC interaction between the NFC chip associated with the user and a transaction authentication device;
 detecting, at a transaction authentication device, the NFC interaction between the NFC chip associated with the user and the transaction authentication device;
 identifying an image written on the NFC chip associated with the user based on the NFC interaction;
 receiving a secondary authentication confirmation from a second user, wherein the secondary authentication confirmation indicates that the image written on the NFC chip is an image of the user associated with a near field communication (NFC) chip; and
 processing the requested transaction in response to the secondary authentication confirmation.

9. The computer program product of claim 8, wherein the transaction request is received by a transaction authentication device associated with a merchant, an online portal associated with the merchant, or a computing device associated with the user.

10. The computer program product of claim 9, wherein:
 transmitting the prompt for the transaction information associated with the transaction request comprises transmitting the prompt for the transaction information associated with the transaction request to the transaction authentication device associated with the merchant or the computing device associated with the user; and
 receiving the transaction information comprises receiving the transaction information from the transaction authentication device associated with the merchant or the computing device associated with the user.

11. The computer program product of claim 8, wherein the NFC chip associated with the user is embedded in a physical card, an wherein resource information written onto the NFC chip comprises at least one of credit card information, debit card information, account information, user information, user account information, shipping information, authentication preference information, transaction amount threshold information, approved transaction type information, prohibited transaction type information, an image associated with the user, and transaction rules.

12. The computer program product of claim 8, wherein determining that the secondary authentication is required to process the transaction comprises:
   identifying a code written on the NFC chip associated with the user; and
   identifying a rule that the secondary authentication is required by comparing the code written on the NFC chip associated with the user to a database of known codes and associated rules.

13. The computer program product of claim 8, wherein the transaction authentication device comprises a mobile device of the user, an NFC reader device associated with the user, or a transaction device associated with a merchant.

14. The computer program product of claim 8, wherein, the computer readable instructions further comprise instructions for, in response to detecting the NFC interaction between the NFC chip associated with the user and the transaction authentication device:
   identifying an image written on the NFC chip associated with the user;
   displaying the image written on the NFC chip associated with the user on a user interface of the transaction authentication device;
   prompting a second user associated with the transaction authentication device to authenticate the user based on the displayed image; and
   receiving an indication that the second user has authenticated the user based on the displayed image.

15. A computer implemented method for secondary authentication via contactless distribution of dynamic resources, said computer implemented method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
      receiving a transaction request associated with a user, wherein the user is associated with a near field communication (NFC) chip;
      transmitting a prompt for transaction information associated with the transaction request;
      receiving the transaction information;
      determining, based on the received transaction information, that a secondary authentication is required to process the transaction;
      transmitting a prompt for secondary authentication of an NFC interaction between the NFC chip associated with the user and a transaction authentication device;
      detecting, at a transaction authentication device, the NFC interaction between the NFC chip associated with the user and the transaction authentication device;
      identifying an image written on the NFC chip associated with the user based on the NFC interaction;
      receiving a secondary authentication confirmation from a second user, wherein the secondary authentication confirmation indicates that the image written on the NFC chip is an image of the user associated with a near field communication (NFC) chip; and
      processing the requested transaction in response to the secondary authentication confirmation.

16. The computer implemented method of claim 15, wherein the transaction request is received by a transaction authentication device associated with a merchant, an online portal associated with the merchant, or a computing device associated with the user.

17. The computer implemented method of claim 16, wherein:
   transmitting the prompt for the transaction information associated with the transaction request comprises transmitting the prompt for the transaction information associated with the transaction request to the transaction authentication device associated with the merchant or the computing device associated with the user; and
   receiving the transaction information comprises receiving the transaction information from the transaction authentication device associated with the merchant or the computing device associated with the user.

18. The computer implemented method of claim 15, wherein the NFC chip associated with the user is embedded in a physical card, an wherein resource information written onto the NFC chip comprises at least one of credit card information, debit card information, account information, user information, user account information, shipping information, authentication preference information, transaction amount threshold information, approved transaction type information, prohibited transaction type information, an image associated with the user, and transaction rules.

19. The computer implemented method of claim 15, wherein determining that the secondary authentication is required to process the transaction comprises:
   identifying a code written on the NFC chip associated with the user; and
   identifying a rule that the secondary authentication is required by comparing the code written on the NFC chip associated with the user to a database of known codes and associated rules.

20. The computer implemented method of claim 15, wherein the transaction authentication device comprises a mobile device of the user, an NFC reader device associated with the user, or a transaction device associated with a merchant.

* * * * *